(12) United States Patent
Desantis et al.

(10) Patent No.: US 6,602,419 B1
(45) Date of Patent: Aug. 5, 2003

(54) PROCESS FOR THE RECOVERY OF IODINE FROM AQUEOUS SOLUTIONS CONTAINING IODINATED ORGANIC COMPOUNDS

(75) Inventors: Nicola Desantis, Milan (IT); Ilaria Peretto, Milan (IT); Salvatore Incandela, Milan (IT); Carlo Felice Viscardi, Milan (IT)

(73) Assignee: Bracco Imagining S.p.A., Milan (IT)

( * ) Notice: Subject to any disclaimer, the term of this patent is extended or adjusted under 35 U.S.C. 154(b) by 0 days.

(21) Appl. No.: 09/856,555

(22) PCT Filed: Nov. 24, 1999

(86) PCT No.: PCT/EP99/09078

§ 371 (c)(1), (2), (4) Date: Jul. 17, 2001

(87) PCT Pub. No.: WO00/32303

PCT Pub. Date: Jun. 8, 2000

(30) Foreign Application Priority Data

Nov. 27, 1998 (IT) .......................................... MI98A2573

(51) Int. Cl.$^7$ ................................................ B01D 61/00
(52) U.S. Cl. .................... 210/652; 210/651; 423/19; 423/486; 423/502
(58) Field of Search .................. 210/652, 651; 423/462, 486, 493, 19, 502; 430/344

(56) References Cited

U.S. PATENT DOCUMENTS

| 3,119,881 | A | * | 1/1964 | Hodson |
| 4,976,947 | A | | 12/1990 | Agreda et al. |
| 5,252,258 | A | * | 10/1993 | Ohtsuka et al. |
| 5,447,635 | A | | 9/1995 | Viscardi et al. |
| 6,004,465 | A | * | 12/1999 | Uhr et al. |

FOREIGN PATENT DOCUMENTS

| EP | 0106934 | * | 4/1983 |
| EP | 0 106 934 | | 5/1984 |
| GB | 2 312 755 | | 11/1997 |
| WO | WO 98/07661 | * | 2/1998 |

\* cited by examiner

*Primary Examiner*—Ana Fortuna
(74) *Attorney, Agent, or Firm*—Nixon & Vanderhye P.C.

(57) ABSTRACT

A process for the recovery of iodine from mother liquors or wastes containing iodinated organic compounds, by mineralisation of organic iodine and subsequent transformation of the formed iodide into elementary iodine, characterized in that the aqueous solution is concentrated to a suitable volume before the mineralisation step, under atmospheric pressure and at the boiling temperature, and said solution is purified by nanofiltration.

7 Claims, No Drawings

PROCESS FOR THE RECOVERY OF IODINE FROM AQUEOUS SOLUTIONS CONTAINING IODINATED ORGANIC COMPOUNDS

DISCLOSURE

The present invention relates to a novel process for the recovery of iodine from solutions containing iodinated organic compounds, in particular non-ionic contrast agents.

The most modern contrast agents, i.e. the non-ionic ones, are usually 2,4,6-triiodo-1,3-benzenedicarboxylic acid derivatives, characterized by a strong bond of the iodine atoms to the aromatic ring. The strength of said bond is however also affected by the structure of the concerned compound.

Due to environmental reasons, the effluents should be completely free from iodinated organic compounds, while for economic reasons as much iodine as possible should be recovered, in that it is now rare and expensive. In this case, economic and environmental needs meet.

The problem has arisen for some time, as evidenced by a series of patents concerning this process (see for example: WO 98/07661; WO 94/10083; NO 9100001; EP 106934). In particular, EP 106934, filed in the Applicant' name in 1982, discloses the process for the mineralisation of iodine, which comprises heating the solutions of the contrast agents for 30 minutes–2 hours at 100–150° C. in a strong alkali excess in the presence of 100 to 2500 ppm of copper ions or of finely dispersed copper.

The recovery of iodine after mineralisation is carried out according to known methods, usually by oxidation of the formed iodide with mild means. The formed iodine is recovered and concentrated, for example, by extraction or by sublimation in air or vapour stream. Iodine can also be recovered from the extraction solvent (for example toluene) by treatment with aqueous alkali hydroxide, and the iodine vapours obtained in the sublimation can be collected, for example, through absorption in alkali hydroxide solutions by iodide-iodate dismutation.

Iodine is known to quantitatively regenerate from the alkali hydroxide solution by acidification following dismutation.

It can easily be evinced from EP 106934 (page 6, Table) that the temperature of the mineralisation process depends on the type of the contrast agent.

The conditions for the preparation of Iopamidol and Metrizamide, which then represented the novel class of non-ionic compounds (i.e. in which the carboxylic groups are in the form of amides with aminoalcohols), are more drastic than those for the ionic compounds, i.e. those having at least one acid group on the aromatic ring (acetrizoic, diatrizoic, iothalamic, iopronic, iopanoic acids, iodamide and adipiodone). For example, the best results are achieved when heating the 2% Iopamidol solution to 150° C. in the presence of 2500 ppm of copper ion.

The most diffused compounds are at present the non-ionic ones. The preparation thereof usually involves crystallizations from a solvent, usually alcoholic, both in the intermediate steps and the final one.

The presence of solvents in wastes from which iodine has to be recovered makes carring out the cited process more difficult, particularly in the following steps:

when the mineralisation process is carried out, according to the teaching of the Patent, at least at 100° C., it is difficult to reach said temperature due to the low-boiling organic solvent (such as a lower alcohol), unless operating under pressure;

the presence of the solvents, in particular alcohols, makes the precipitation of iodine after sublimation problematic, unless using a system of scrubber;

when using an alternative process for recovering the sublimated iodine (treatment with alkali and subsequent precipitation of iodine by acidification), side-formation of iodoform takes places due to the presence of compounds having $RCOCH_3/RCHOHCH_3$ groups.

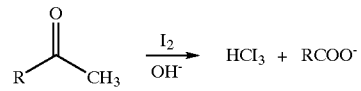

Said reaction, which has to be absolutely avoided for environmental reasons, also prevents the recovery of iodine due to the precipitation of iodoform.

finally, it is necessary to increase the amount of oxidizer necessary to oxidize the iodide formed after mineralisation.

A further technical problem which had not been evidenced in the above Patent is that, after the mineralisation step, phenol or quinone organic compounds are present which cause a consumption of oxidizer in the subsequent oxidation step and moreover have a high environmental impact, in that they are not biodegradable.

It has now surprisingly been found that the above cited problems can be solved by concentrating the solution obtained under the mineralisation conditions described in EP 106,934 and purifying said solution by nanofiltration before the oxidative step, thereby improving the overall yield of process.

It is therefore an object of the present invention a process for the recovery of iodine from mother liquors or wastes with a percentage of organic solvents at most of 95% (w/w), containing iodinated organic compounds, by mineralisation of organic iodine (in the presence of copper ions or finely dispersed metallic copper in alkali aqueous solution) and subsequent transformation of the formed iodide into elementary iodine, characterized in that the aqueous solution, after mineralisation, is concentrated under atmospheric pressure and at the boiling temperature and is subsequently subjected to nanofiltration.

The process is particularly suitable for the treatment of solutions of non-ionic iodinated contrast agents, such as: Iopamidol, Iohexol, Iopromide, Ioxilan, Iomeprol, Iopentol, Ioversol. The process of the invention can also be applied to ionic contrast agents, if the above stated conditions are fulfilled. In this case, aqueous or organic solvents solutions will be present, depending on compound or waste to be treated and on the synthetic step.

The solution is preferably adjusted to a volume ranging from 85% to 25% (w/w) of the starting volume. Said procedure is easily applicable to waste solutions from the synthesis of ionic or non-ionic contrast agents, possibly in the presence of solvents, and it allows to decrease the COD from values of 20.000–40.000 mg/L to 4.000–9.000 mg/L through demolition of the organic molecules present and removal of any solvents.

The conditions of the mineralisation process of the present invention are the same as those disclosed in EP 106,934.

The copper catalyst is added in amounts from 100 to 3000 ppm, preferably 500–1000 ppm, and pH is kept at 12 during the whole mineralisation step.

The process of the invention comprises heating the solution to be deiodinated at the boiling temperature and under atmospheric pressure.

This, of course, involves rather long times such as:

1. 4 to 6 hours for mineralising a solution of Iopamidol, Iomeprol, Iohexol, Metrizamide or of a generic non-ionic contrast agent, in concentration of 2%–10% (w/w) with an at most 95% (w/w) content in alcoholic solvent;
2. 2 to 3 hours for mineralising a solution of the mother liquors from the production of Iopamidol intermediates containing 3%–15% (w/w) of iodinated intermediate, with the following maximum contents (w/w): 2-butanol 20%, methylchloroform 5%, n-butyl acetate 4%, n-dodecane 3% (w/w) and tert-butanol 30%. As mentioned above, the process of the invention can also be used for mother liquors from production cycles of other ionic contrast agents such as:

3,5-acetylamino-2,4,6-triiodo-benzoic acid sodium salt (DIAC), acetrizoic acid (3-acetamino-2,4,6-triiodobenzoic acid);

adipione (3,3'-[(I,1,6-dioxo-1,6-hexanediyl)diimino]-bis-2,4,6-triiodobenzoic acid;

iodossamic acid (3,3'-[(1,16-dioxo-4,7,10,13-tetraoxahexadecane-1,16-diyl)diimino]-bis-2,4,6-triiodo benzoic acid;

iothalamic acid (3-(acetylamino)-2,4,6-triiodo-5-[(methylamino)carbonyl]-benzoic acid;

iopronic acid (2-[[2-[3-(acetylamino-2,4,6-triiodo-phenoxy]ethoxy] methyl]butanoic acid;

iopanoic acid, 3-amino-$\alpha$-ethyl-2,4,6-triiodobenzenepropionic acid.

The above Patent did not envisage any concentration or elimination step of the organic solvents (see examples 1, 2, 4, 5, 7, 27, 55).

In Examples 3 and 6, concerning non-ionic contrast agents (Iopamidol and Metrizamide) it is even necessary to use an autoclave or a sealed container to carry out the mineralisation at 130–150° C. for 1 hour.

Conversely, a feature of the process of the invention is a concentration step under atmospheric pressure, which avoids the use of an autoclave, making use of the ebullioscopic raising due to the solids present at 105–120° C. and increasing the duration of the step by 2–6 hours. When the solutions do not contain salts dissolved so as to guarantee the ebullioscopic raising, sodium sulfate and/or sodium chloride can be added to produce such an effect. The amounts to be added depend on the mixture to be mineralised.

Operating this way, any solvents present are removed by either direct or vapour stream distillation while carrying out the mineralisation of iodine.

This is particularly important in the case of lower alcohols which are the most used solvents in the processes for the preparation of non-ionic contrast agents which comprise a final crystallization and which can give rise to iodoform, as already mentioned.

Furthermore, the solution to be fed to the subsequent step is concentrated, which is particularly useful in case it allows to remove some inorganic salts less soluble than sodium iodide.

This simple operation provides a significant decrease in the contamination load with an increase in biodegradability. For example, in a production waste of Iopamidol, starting from a COD of 25.000 mg/L and a BOD of 1.500 mg/L, a solution can be obtained with COD 7.000 and BOD 3.500 at the end of the mineralisation. This reduction is due to the elimination of the solvents and to the partial degradation of the aromatic molecules.

It is also possible to include a filtration step of the solution after mineralisation and a concentration step when high concentrations of poorly soluble saline compounds are present, which can precipitate in the concentration step (in particular the precipitation of $Na_2SO_4 \cdot 10\ H_2O$ can take place).

Filtration provides the advantage of removing part of the ionic compounds present in solution, thereby reducing the osmotic pressure in the subsequent nanofiltration step.

The solution, after mineralisation, concentration and optional filtration, is purified by nanofiltration. Said operation is carried out in two steps:

1. nanofiltration of the solution;
2. diafiltration with addition of water so as to adjust the permeated solution to about the starting volume before the mineralisation step.

The process of the present invention surprisingly employs this technique keeping the permeate instead of the retentate, which is more commonly the purified fraction. In this case, the solution from which the iodine is recovered is the permeate, mainly containing sodium iodide, purified from the high molecular organic substances and from sodium sulfate and any sodium sulfite.

The iodide concentration of the permeate ranges from 0.6 to 1.4%, evaluated by argentometric titration.

The final step for the recovery of solid iodine is effected conventionally, as cited above.

Particularly preferred is the use of hydrogen peroxide as oxidizer, at pH 0.5–1.5 by addition of 50% w/w sulfuric acid, at room or high temperature (20–50° C.), mainly in that the reduced product is water.

The almost complete absence of organic molecules advantageously reduces the amount of oxidizer necessary. In fact, in the process of the invention, only a slight excess (5–15%) to the stoichiometric is envisaged.

The oxidation is substantially instantaneous, as no oxidizable side-products are present, and is monitored by measuring the ox-redox potential with a platinum electrode.

The reaction is considered completed at a 480–540 mV of calomel-relative potential.

The last step is the recovery of iodine by two ways:

1. Filtration of the precipitated iodine, which is possible, contrary to the prior art, in that only NaCl is present in the solution. To improve precipitation yields the solution may be concentrated to 30–50% of the starting volume before the oxidation, guarantying an about 3% iodine content. Total yields are about 88–90% on theoretical.
2. Sublimation of precipitated iodine in vapour stream, absorption in alkali (preferably 30% NaOH) as $I^-/IO_3^-$ at a iodine maximum concentration of 3.5% and precipitation by acidification. In this case, total yields are about 90–95% on theoretical.

According to a further aspect of the invention the oxidation and recovery of iodine are carried out in a single step.

The permeate from the nanofiltration step is acidified to pH 0.5–1 with 50% sulfuric acid, at temperatures ranging from 20° C. to 50° C. Said solution is fed to a continuous extractor adding the oxidizer in line so as to guarantee a permanence time sufficient for the complete oxidation and extraction. Iodine is extracted with a suitable solvent (such as toluene, methyl tert-butyl ether, dodecane). This way iodide is oxidized to iodine and extracted from the aqueous solution in a single industrial operation. Iodine is extracted from the solvent by treatment with bases and then recovered as already described above. The overall yield is, in this case, about 93–96% on theoretical.

The following examples illustrate the best experimental conditions to carry out the process of the invention.

EXPERIMENTAL SECTION

EXAMPLE 1

30 kg of mixture of effluents from the production of Iopamidol, containing about 4% (w/w) of organic solvents (2-butanol, butyl acetate, diglyme, tert-butanol, dodecane), about 0.4% (w/w) of 2,4,6-triiodo-5-amino-1,3-benzenedicarboxylic acid, about 0.9% of Iopamidol and its side-products (the iodine content of the mixture being 0.75% (w/w)) are adjusted to pH 12 with 30% NaOH (w/w). 5 9 of $CuSO_4 \cdot 5\ H_2O$ are added and the mixture is concentrated under atmospheric pressure to about 80% of the starting weight; then the reaction mixture is refluxed to complete the mineralisation, so that the total distillation and reflux time is 6 hours.

The mineralisation yield is 100% (determined on the iodine content by argentometric titration compared with the starting content in organic iodine).

The concentrated solution is left to cool and buffered to pH 7 with 50% $H_2SO_4$ (w/w) then subjected to nanofiltration, using a Separem membrane mod. Desals (DK2521T) at an operative pressure of 25–30 bar. The solution is diafiltered adding water, keeping the retentate volume substantially constant (about 30 L of $H_2O$ are added). The collected permeate (30 L) is concentrated to 12 L under atmospheric pressure, then acidified to pH 1 with 50% $H_2SO_4$ (w/w) and treated with 30% $H_2O_2$ (w/w) at room temperature monitoring the redox potential of the solution; the reaction is completed when a 520 mV potential is reached. The precipitated elementary iodine is recovered by filtration through porous septum!.

198 g of elementary iodine are obtained (88% overall yield of the process).

EXAMPLE 2

40 kg of mixture of effluents from the production of Iopamidol, containing about 4% of organic solvents (2-butanol, butyl acetate, diglyme, tert-butanol, dodecane), about 0.4% (w/w) of 2,4,6-triiodo-5-amino-1,3-benzenedicarboxylic acid and about 0.9% (w/w) of Iopamidol and its side-products (the iodine content of the mixture being 0.70% (w/w)) are adjusted to pH 12 with 30% NaOH (w/w). 6 g of $CuSO_4 \cdot 5\ H_2O$ are added, the mixture is concentrated under atmospheric pressure to 30% of the starting weight, then refluxed to complete mineralisation, so that the overall distillation and reflux time is 8 hours.

The yield mineralisation is 100% (determined on the iodine content by argentometric titration compared with the starting content in organic iodine).

The concentrated solution is left cool at 15° C. for 2 hours and the precipitated salts are filtered through porous septum. The solution is buffered to pH 7 with 50% $H_2SO_4$ (w/w) and subjected to nanofiltration, using a Separem membrane mod. Desal5 (DK2521T) at an operative pressure of 25–30 bars. The solution is diafiltered, keeping the retentate volume constant (about 28 L of $H_2O$ are added).

The recovery of iodine in the permeate is 99% compared with that present in the solution before nanofiltration.

The collected permeate (30 L) is acidified to pH 1 with 50% $H_2SO_4$ (w/w). The resulting solution is oxidized at room temperature (25° C.) in a continuous oxidation-extraction system. Oxidation is carried out feeding in line 30% $H_2O_2$ (w/w) to the permeate at pH 1: the aqueous solution is then fed to a continuous laboratory extractor and the elementary iodine formed following oxidation is extracted with dodecane. The amount of 30% $H_2O_2$ (w/w) used is defined monitoring the redox potential directly at the head of the extractor keeping it at 530 mV. The used volumetric ratios are 3 L of dodecane to 1 L of aqueous solution. 90 L of organic phase are collected.

The extraction yield of iodine, is 98% compared with the amount of iodine present in the permeation solution from nanofiltration.

The organic phase is again subjected to extraction in a continuous system with an aqueous alkali solution (30% NaOH (w/w) in volumetric ratio of 1 L to 16 L of organic phase). The resulting alkaline solution (5.6 L) is adjusted to pH 1 with 50% $H_2SO_4$ (w/w). The precipitated elementary iodine is recovered by filtration.

257 g of iodine are obtained (overall yield 92% of the process).

EXAMPLE 3

40 kg of mixture of effluents from the production of Iopamidol, containing about 30% (w/w) of organic solvents (2-butanol and tert-butanol), about 10% (w/w) of 2,4,6-triiodo-5-amino-1,3-benzenedicarboxylic acid and about 4% (w/w) of Iopamidol and its side-products (the iodine content of the mixture being 8.76% (w/w)) are adjusted to pH 12 with 30% NaOH (w/w) 75 g of $CuSO_4 \cdot 5\ H_2O$ are added, the mixture is concentrated under atmospheric pressure to 30% (w/w) of the starting weight, then refluxed to complete the mineralisation, so that the total distillation and reflux time is 8 hours.

The mineralisation yield is 100% (determined on the iodine content by argentometric titration compared with the starting content in organic iodine).

The concentrated solution is left to cool at 15° C. for 2 hours and the precipitated salts are filtered through porous septum. The solution is buffered to pH 7 with 50% $H_2SO_4$ (w/w) and subjected to nanofiltration, using a Separem membrane mod. Desal5 (DK2521T) at an operative pressure of 25–30 bars. The solution is diafiltered, keeping the volume of the retentate constant (about 40 L of $H_2O$ are added).

The recovery of iodine in the permeate is 99% compared with that present in the solution before nanofiltration.

The collected permeate (40 L) is acidified to pH 1 with 50% $H_2SO_4$ (w/w). The resulting solution is oxidized at room temperature (25° C.) in a continuous oxidation-extraction system. Oxidation is carried out feeding in line 30% $H_2O_2$ (w/w) to the permeate at pH 1: the aqueous solution is then fed to a continuous laboratory extractor and the elementary iodine formed following oxidation is extracted with dodecane. The amount of 30% $H_2O_2$ (w/w) used is defined by monitoring the redox potential directly at the head of the extractor keeping it at 530 mV. Volumetric ratios are 3 for dodecane and 1 for the aqueous solution. 120 L of organic phase are collected.

The extraction yield in iodine is 98% compared with the amount of iodine present in the permeation solution from nanofiltration.

The organic phase is again subjected to extraction in a continuous system with an aqueous alkali solution (30% NaOH (w/w) in volumetric ratio of 1 L for 20 L of organic phase). The resulting alkaline solution (6 L) is adjusted to pH 1 with 50% $H_2SO_4$ (w/w). The precipitated elementary iodine is recovered by filtration.

3225 g of iodine are obtained (92% overall yield of the process).

EXAMPLE 4

20 kg of mother liquors from Iopamidol crystallization, containing about 20% (w/w) of 2-butanol (the iodine content of the mixture being 1.54% (w/w)) are adjusted to pH 12 with 30% NaOH (w/w). 4 g of $CuSO_4 \cdot 5\ H_2O$ are added and the mixture is concentrated under atmospheric pressure to 50% of the starting weight, then is refluxed to complete the mineralisation, so that the total distillation and reflux time is 6 hours.

The mineralisation yield is 100% (determined on the iodine content by argentometric titration compared with the starting content in organic iodine).

The concentrated solution is left to cool, buffered to pH 7 with 50% $H_2SO_4$ (w/w) and then subjected to nanofiltration, using a Separem membrane mod.Desal5 (DK2521T) at an operative pressure of 25–30 bars. The solution is diafiltered adding water and keeping the retentate volume substantially constant (about 20 L of $H_2O$ are added). The collected permeate (20 L) is concentrated under atmospheric pressure to 10 L, then acidified to pH 1 with 50% $H_2SO_4$ (w/w) and treated with 30% $H_2O_2$ (w/w) at room temperature monitoring the redox potential of the solution, the reaction is completed when a 530 mV potential is reached. Elementary iodine is recovered by filtration through porous septum.

277 g of elementary iodine are obtained (90% overall yield of the process).

EXAMPLE 5

40 kg of mixture of effluents from the production of Iopamidol, containing about 15% (w/w) of organic solvents (2-butanol and tert-butanol), about 10% (w/w) 2,4,6-triiodo-5-amino-1,3-benzenedicarboxylic acid and about 4% (w/w) of Iopamidol and its side-products (the iodine content of the mixture being 2.5% (w/w)) are adjusted to pH 12 with 30% NaOH (w/w). 75 g of $CuSO_4 \cdot 5\ H_2O$ are added, the mixture is concentrated under atmospheric pressure to 30% (w/w) of the starting weight, then refluxed to complete the mineralisation, so that the, total distillation and reflux time is 6 hours.

The mineralisation yield is 100% (determined on the iodine content by argentometric titration compared with the starting content in organic iodine).

The concentrated solution is left to cool at 15° C. for 2 hours and the precipitated salts are filtered through porous septum. The solution is buffered to pH 7 with 50% $H_2SO_4$ (w/w) and subjected to nanofiltration, using a Separem membrane mod. Desal5 (DK2521T) at an operative pressure of 25–30 bars. The solution is diafiltered, keeping the retentate volume constant (about 40 L of $H_2O$ are added).

The recovery of iodine in the permeate is 99% compared with that present in the solution before nanofiltration.

The collected permeate (40 L) is concentrated under atmospheric pressure to 20 L, then acidified to pH 1 with 50% $H_2SO_4$ (w/w) and treated with 30% $H_2O_2$ (w/w) at room temperature monitoring the redox potential of the solution; the reaction is completed when a 540 mV potential is reached. The precipitated elementary iodine is separated by sublimation in vapour stream and absorption in 30% (w/w) NaOH in the form of $I^-/IO_3^-$ a iodine concentration of 3.5%. The resulting alkaline solution is adjusted to pH 1 with 50% $H_2SO_4$ (w/w). The precipitated elementary iodine is recovered by filtration.

910 g of iodine are obtained (91% overall yield of the process).

EXAMPLE 6

30 kg of some production wastes from the production cycle of Iopamidol, containing about 5% (w/w) of organic solvents (2-butanol, butyl acetate), about 20% (w/w) of 2,4,6-triiodo-5-amino-1,3-benzendicarboxylic acid and 20% (w/w) about of Iopamidol and its side-products (the iodine content of the mixture being 21.5% (w/w)) are adjusted to pH 13 with 30% NaOH (w/w). 145 g of $CuSO_4 \cdot 5\ H_2O$ are added, the reaction mixture is concentrated under atmospheric pressure to 60% (w/w) of the starting weight, then refluxed to complete the mineralisation, so that the total distillation and reflux time is 8 hours.

The mineralisation yield is 100% (determined on the iodine content by argentometric titration compared with the starting content in organic iodine).

The concentrated solution is left to cool and buffered to pH 7 with 50% $H_2SO_4$ (w/w). The resulting neutral solution is subjected to nanofiltration, using a Separem membrane mod. Desal5 (DK2521T) at an operative pressure of 25–30 bars. The solution is diafiltered, keeping the volume of the retentate constant (about 50 L of $H_2O$ are added).

The recovery of iodine in the permeate is 99% compared with that present in the solution before nanofiltration.

The collected permeate (50 L) is concentrated under atmospheric pressure to 20 L, then acidified to pH 1 with 50% $H_2SO_4$ (w/w) and treated with 30% $H_2O_2$ (w/w) at room temperature monitoring the redox potential of the solution; the reaction is completed when a 550 mV potential is reached. The precipitated elementary iodine is recovered by filtration.

5740 g of iodine are obtained (91% overall yield of the process).

EXAMPLE 7

40 kg of mixture of effluents from the production of Iomeprol and 2,4,7-triiodo-3,5-acetamido-benzoic acid sodium salt, containing about 10% (w/w) of organic solvents (n-butanol and ethanol), about 10% (w/w) of 2,4,6-triiodo-5-amino-1,3-benzenedicarboxylic acid and 2,4,7-triiodo-3,5-acetamido-benzoic acid and about 4% (w/w) of Iomeprol and its side-products (the iodine content of the mixture being 8.76% (w/w)) are adjusted to pH 13 with 30% NaOH (w/w). 80 g of $CuSO_4 \cdot 5\ H_2O$ are added, the mixture is concentrated under atmospheric pressure to 30% (w/w) of the starting weight; then the reaction mixture is refluxed to complete the mineralisation, so that the total distillation and reflux time is 8 hours.

The mineralisation yield is 100% (determined on the iodine content by argentometric titration compared with the starting content in organic iodine).

The concentrated solution is left to cool at 15° C. for 2 hours and the precipitated salts are filtered through porous septum. The solution is buffered to pH 7 with 50% $H_2SO_4$ (w/w) and subjected to nanofiltration, using a Separem membrane mod. Desal5 (DK2521T) at an operative pressure of 25–30 bars. The solution is diafiltered, keeping the volume of the retentate constant (about 45 L of $H_2O$ are added).

The recovery of iodine in the permeate is 99.5% compared with that present in the solution before nanofiltration.

The collected permeate (45 L) is acidified to pH 1 with 50% $H_2SO_4$ (w/w). The resulting solution is oxidized at room temperature (25° C.) adding 30% $H_2O_2$ (w/w) to the solution. The amount of 30% $H_2O_2$ (w/w) used is defined by monitoring the redox potential considering the oxidation concluded when a 530 mV potential is reached. The mixture is cooled to 5° C. for about 3 hours and the precipitated iodine is recovered by filtration.

3225 g of iodine are obtained (97% overall yield of the process).

What is claimed is:

1. A process for the recovery of iodine from mother liquors or wastes containing iodinated organic compounds, by mineralisation of organic iodine and subsequent transformation of the formed iodide into elementary iodine, characterized in that the aqueous solution is concentrated to a suitable volume during the mineralisation step, under atmospheric pressure and at the boiling temperature, and said solution is purified by nanofiltration.

2. A process as claimed in claim 1, in which the mineralisation of organic iodine is carried out by addition of copper ions or finely dispersed metallic copper in alkali aqueous solution, in amounts from 100 to 3000 ppm at pH 12.

3. A process as claimed in claim 2, in which the amount of copper ranges from 500 to 1000 ppm.

4. A process according to claim 1, in which the concentration step of the solution to be deiodinated is carried out under atmospheric pressure and at the boiling temperature for a time from 2 to 6 hours.

5. A process according to claim 1, in which the oxidizing agent used is hydrogen peroxide.

6. A process according to claim 1 in which the oxidation and the recovery of iodine are carried out in a single step.

7. A process as claimed in claim 6, in which the permeate from nanofiltration is acidified to pH 0.5–1 with 50% sulfuric acid at temperatures ranging from 20° C. to 50° C., and the resulting solution is fed to a continuous extractor feeding in line the oxidizer so as to guarantee a permanence time sufficient for the completed oxidation and extraction of iodine with a suitable solvent.

* * * * *